United States Patent
Weber et al.

(10) Patent No.: US 7,077,115 B2
(45) Date of Patent: Jul. 18, 2006

(54) DIRECT INJECTION GASEOUS FUEL ENGINE WITH IGNITION ASSIST

(75) Inventors: Robert S. Weber, Lincoln, MA (US); John Paul Mello, Newton, MA (US); Suresh Sriramulu, Arlington, MA (US); Derek James Bezaire, Toronto (CA)

(73) Assignee: Westport Research Inc., Vancouver (CA)

( * ) Notice: Subject to any disclaimer, the term of this patent is extended or adjusted under 35 U.S.C. 154(b) by 0 days.

(21) Appl. No.: 11/150,035

(22) Filed: Jun. 10, 2005

(65) Prior Publication Data

US 2006/0021605 A1   Feb. 2, 2006

Related U.S. Application Data

(63) Continuation of application No. PCT/CA03/01723, filed on Nov. 7, 2003.

(30) Foreign Application Priority Data

Nov. 15, 2002   (CA) .................................... 2412571

(51) Int. Cl.
  F02B 51/02   (2006.01)
(52) U.S. Cl. .................... 123/670; 123/145 A
(58) Field of Classification Search .......... 123/27 GE, 123/145 R, 145 A, 298, 527, 670
  See application file for complete search history.

(56) References Cited

U.S. PATENT DOCUMENTS

| | | | |
|---|---|---|---|
| 2,198,850 A | 4/1940 | White | |
| 2,767,691 A | 10/1956 | Mengelkamp et al. | |
| 3,703,886 A | 11/1972 | Witzky | |
| 4,121,543 A | 10/1978 | Hicks, Jr. et al. | |
| 4,345,555 A | 8/1982 | Oshima et al. | |
| 4,358,663 A | 11/1982 | Sperner et al. | |
| 4,359,977 A | 11/1982 | Sperner et al. | |
| 4,459,948 A | 7/1984 | Bauer | |
| 4,590,914 A * | 5/1986 | Rosky et al. | 123/557 |
| 4,721,081 A | 1/1988 | Krauja et al. | |
| 4,989,573 A | 2/1991 | Yokoyama et al. | |
| 5,329,908 A * | 7/1994 | Tarr et al. | 123/527 |
| 5,676,100 A | 10/1997 | Dam et al. | |
| 6,076,493 A | 6/2000 | Miller et al. | |

* cited by examiner

Primary Examiner—Noah P. Kamen
(74) Attorney, Agent, or Firm—McAndrews, Held & Malloy, Ltd.

(57) ABSTRACT

An internal combustion engine and a method of operating same are provided with direct injection of gaseous fuel into a combustion chamber and an ignition assist apparatus disposed within the combustion chamber. An ignition assist apparatus disposed within the combustion chamber comprises an electric incandescent ignitor with a sleeve disposed around the ignitor and a catalytic alloy. The catalytic alloy comprises a first catalytic element with a greater affinity for oxygen than that of a second catalytic element, and the second catalytic element having a greater affinity for the fuel than that of the first catalytic element.

21 Claims, 12 Drawing Sheets

DIRECT INJECTION GASEOUS FUEL ENGINE WITH IGNITION ASSIST

CROSS-REFERENCE TO RELATED APPLICATION(S)

This application is a continuation of International Application No. PCT/CA2003/001723, having an international filing date of Nov. 7, 2003, entitled "Direct Injection Gaseous Fuel Engine With Ignition Assist". International Application No. PCT/CA2003/001723 claimed priority benefits, in turn, from Canadian Patent Application No. 2,412,571 filed Nov. 15, 2002. International Application No. PCT/CA2003/001723 is also hereby incorporated by reference herein in its entirety.

FIELD OF THE INVENTION

The present invention relates to a direct injection gaseous fuel engine with ignition assist. More particularly, the ignition assist comprises an electric incandescent ignitor combined with a sleeve, also known as a shield, disposed around the ignitor and a preferred catalyst formulation provided on the sleeve and/or the ignitor.

BACKGROUND OF THE INVENTION

An electric incandescent ignitor, such as a glow plug, is commonly used in internal combustion engines to assist with cold starting diesel-cycle engines. Diesel cycle engines are designed so that, after the engine warms up, the conditions within the engine combustion chamber are suitable for auto-igniting the diesel fuel and the glow plug is no longer required to assist with fuel ignition.

To reduce engine emissions, fuels that burn cleaner than diesel fuel are being studied. For example, gaseous fuels such as methane, natural gas, propane, and hydrogen can all be burned in an internal combustion engine operating on the diesel cycle to produce lower emissions of oxides of nitrogen (NOx) and particulate matter (PM), compared to an equivalent engine fueled with conventional diesel fuel. Other advantages of injecting such gaseous fuels directly into the combustion chamber of an engine operating on the diesel cycle are that the efficiency and power characteristics associated with the diesel cycle are maintained.

However, such gaseous fuels do not auto-ignite as readily as diesel fuel. Consequently, to convert a conventional diesel engine to operate using a gaseous fuel, a means for assisting ignition is normally required. One strategy for igniting such gaseous fuels is to employ a device for assisting ignition. For example, U.S. Pat. No. 6,076,493, entitled "Glow Plug Shield with Thermal Barrier Coating and Ignition Catalyst", discloses an apparatus for using a glow plug and shield arrangement for assisting ignition of a fuel with a higher auto-ignition temperature compared to diesel fuel. The '493 patent relates to a combination of a glow plug and a shield having a coating of a thermal barrier material. The '493 patent discloses the desirability of using a catalyst but does not disclose any particular fuel or any particular catalyst formulation, and to the applicants' knowledge, commercialization of such an ignition assist strategy for gaseous fuels has not yet been achieved.

While there are many elements that are known to act as a catalyst not all catalysts perform as well for assisting with ignition of gaseous fuels and there is a need for a catalyst formulation that has the durability required for use in an engine combustion chamber. In addition to pure catalytic compositions comprising one catalytic element, catalytic alloys can also be used, comprising more than one catalytic element, or a catalytic element combined with another material. One catalyst formulation may be effective for one fuel but not as effective for another.

Nevertheless, for an ignition assist apparatus that is employed continuously during engine operation, it remains desirable to provide a catalyst to assist with ignition of the fuel so that the glow plug can be operated at a lower temperature. Lower glow plug operating temperatures are generally associated with longer glow plug service life. Use of a catalyst can also provide an additional element of control over the combustion process. Accordingly, for a gaseous fuel with a higher auto-ignition temperature compared to diesel fuel, there is a need to find preferred catalyst formulations for commercial use in the combustion chamber of an internal combustion engine.

The manufacturing means by which a catalyst is deposited on a glow plug or sleeve disposed around the glow plug can also influence the effectiveness of the catalyst. Accordingly, there is also a need to determine a preferred means for depositing catalyst on a glow plug sleeve.

SUMMARY OF THE INVENTION

An internal combustion engine is provided which comprises a combustion chamber defined by a cylinder, a cylinder head covering one end of the cylinder, and a piston reciprocable within the cylinder and having a piston head facing the cylinder head. The engine further comprises:
  (a) an intake port for introducing a charge into the combustion chamber;
  (b) an exhaust port for exhausting combustion products from the combustion chamber;
  (c) a fuel injection valve disposed in the cylinder head for introducing a fuel directly into the combustion chamber; and
  (d) an ignition assist apparatus disposed within the combustion chamber comprising an electric incandescent ignitor with a sleeve disposed around the ignitor and a catalytic alloy, the catalytic alloy comprising a first catalytic element with a greater affinity for oxygen than that of a second catalytic element, and the second catalytic element having a greater affinity for the fuel than that of the first catalytic element.

It is believed that the catalytic alloy provides a bi-functional mechanism that promotes reactions involving the fuel and oxygen that can be an improvement over using a single catalytic element. A conventional ignition assist apparatus coated with single catalytic element may be suitable for the less demanding operating conditions that are associated with an ignition assist apparatus that is only used during start up, or with fuels that have a cetane number that allows relatively easy ignition. The present ignition assist apparatus, which employs a catalytic coating, provides advantages that become more evident when used with fuels that are more difficult to ignite by reducing the requisite temperature for assisting ignition and extending the service life of an ignition assist apparatus. For such fuels, the ignition assist apparatus can be used continuously during the operation of the engine, and extending the service life of the ignition assist apparatus is very important to achieve the durability that is needed for a commercial product.

In a preferred embodiment the fuel is a gaseous fuel and said electric incandescent ignitor is heated on a continuous basis while the engine is operating. The gaseous fuel can comprise methane, which is a fuel that burns more cleanly compared to conventional liquid fuels. It is well known that methane is the main component of natural gas.

For gaseous fuels, the first catalytic element can be ruthenium, when ruthenium has a higher affinity for oxygen, compared to its affinity for the gaseous fuel. To provide a bi-functional mechanism, the second catalytic element can be selected from the group consisting of palladium and platinum, with the second catalytic element being selected to have a greater affinity for the fuel, compared to its affinity for oxygen. In one preferred embodiment, the first catalytic element represents a higher proportion by weight of the catalytic alloy than the second catalytic element. For example, experimental data has shown that in a preferred alloy composition, of the catalytic material in the catalytic alloy, the first catalytic element, which has a higher affinity for oxygen than for the fuel, is about 75 percent by weight.

The sleeve disposed around the ignitor preferably comprises an interior surface facing the ignitor and an exterior surface facing the combustion chamber, with the catalytic alloy coating disposed on both the interior and the exterior surfaces. The sleeve can have a tubular portion that surrounds the ignitor and an open end. In a preferred embodiment, the sleeve has a tubular portion that surrounds the ignitor, a closed end, and a plurality of holes for introducing a combustible mixture comprising the fuel into a shielded space between the sleeve and the ignitor, and for expelling a combustion flame from the shielded space into the combustion chamber.

A method is provided of assisting ignition of a fuel in an operating internal combustion engine. When the engine is running, in each engine cycle the method comprises:
 (a) introducing a charge into the combustion chamber through an intake port;
 (b) injecting the fuel directly into a combustion chamber;
 (c) electrically heating a glow plug to assist with igniting the fuel;
 (d) exhausting combustion products from the combustion chamber through an exhaust port; and
 (e) shielding the glow plug with a sleeve spaced apart and substantially around the sides of the glow plug, wherein the sleeve has a catalytic coating deposited thereon, the catalytic coating comprising a first catalytic element and a second catalytic element, wherein the first catalytic element has a greater affinity for oxygen than that of the second catalytic element, and the second catalytic element has a greater affinity for the fuel than that of the first catalytic element.

In a preferred method, the fuel is a gaseous fuel such as natural gas. The first catalytic element is preferably ruthenium and the second catalytic element is preferably palladium.

When the engine is running, the glow plug can be heated continuously by applying a voltage of between 10 volts and 12 volts.

According to a preferred method, when the engine is running, the timing for injecting the fuel can start when a piston reciprocating within the cylinder is between 40 degrees before top dead center and 10 degrees after top dead center. By injecting the fuel directly into the combustion chamber, and with this timing, the engine can operate with performance and efficiency that is comparable to that of a diesel engine that uses diesel fuel.

In a preferred method of manufacturing the ignition assist apparatus, the sleeve is heat treated after the catalytic coating is deposited thereon and before installation and use in an engine. The heat treatment can comprise heating the sleeve in the air to a temperature of 500° C.–1000° C. for at least 10 minutes (for example, between 10 minutes and 8 hours).

BRIEF DESCRIPTION OF THE DRAWINGS

FIG. 9b is a graph that plots data of the coefficient of variation of maximum cylinder pressure, which is representative of combustion stability, for the same catalyst formulations of FIG. 9a.

DETAILED DESCRIPTION OF PREFERRED EMBODIMENT(S)

A 1.8 liter 4-cylinder diesel engine was converted to operate using natural gas as the fuel. The natural gas was injected directly into an open combustion chamber with the fuel injection event beginning between 40 degrees before top dead center (TDC) and 10 degrees after TDC, where TDC is defined as being when the engine piston is at a position during the engine cycle where it is closest to the cylinder head and "degrees" are crank angle degrees measured by crank shaft rotation.

Figure 1:
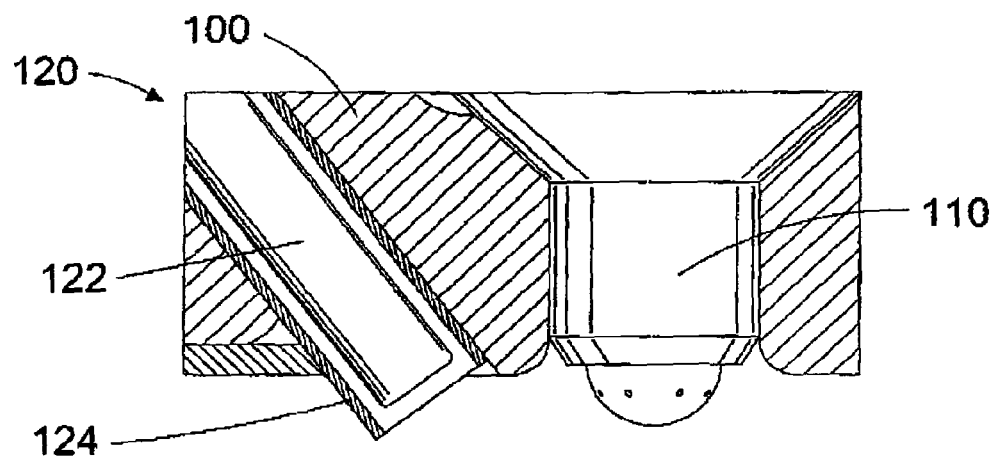
FIG. 1 is and 1A are each a cut away view of the upper portion of a combustion chamber, illustrating part of the cylinder head that is associated with a fuel injection valve for injecting a gaseous fuel directly into the combustion chamber, and an ignition assist apparatus comprising a tubular sleeve disposed around a glow plug.
Figure 1A:
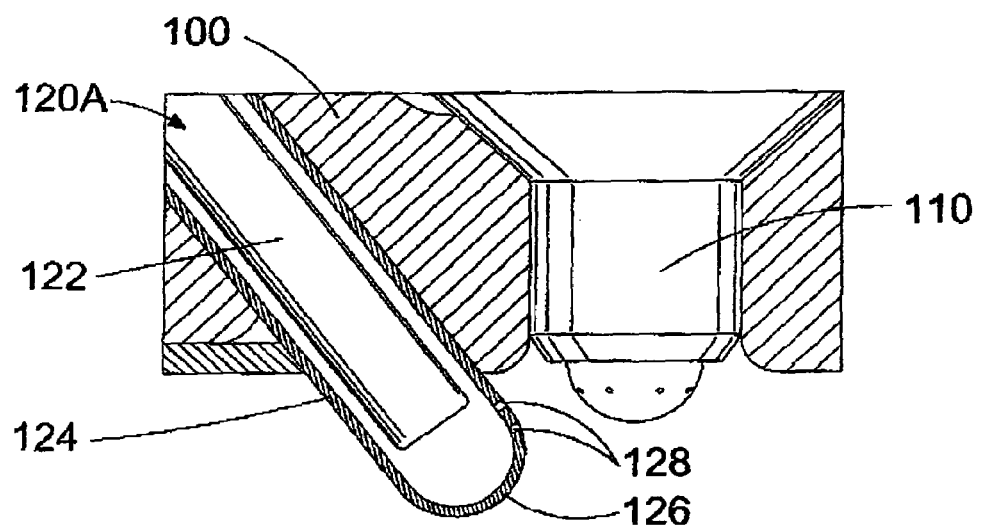

FIG. 1 illustrates pan of cylinder head 100 that shows the modifications made to the combustion chamber. The remainder of the combustion chamber remained the same as it would be for the same engine burning diesel fuel. For injecting gaseous fuel, fuel injection valve 110 was installed in the same opening normally used for a convention diesel fuel injection valve. A preferred embodiment for fuel injection valve 110 is a directly acuated fuel injection valve that employs a magnetostrictive or piezoelectric actuator and a hydraulic link assembly, such as the fuel injection valve disclosed in co-owned U.S. Pat. No. 6,298,829. Ignition assist apparatus 120 is installed at an angle such that the free end of glow plug 122 leans in the direction of fuel injection valve 110 A tubular portion of sleeve 124 is spaced apart and surrounding glow plug 122. The free end of glow plug 122 is recessed from the open end of sleeve 124. FIG. 1A illustrates another embodiment of ignition assist apparatus 120A with components like those of the embodiment of FIG. 1 labelled with the same reference numbers. That is, common to both embodiments are cylinder head 100, fuel injection valve 110, glow plug 122 and sleeve 124. What is different in the embodiment of FIG. 1A is that sleeve 124 has a closed end 126 and a plurality of holes 128 through which a combustible mixture comprising fuel can be introduced into the space between the sleeve and the ignitor.

A problem with using a catalyst in the combustion chamber of an internal combustion engine is durability. The harsh conditions within the combustion chamber during operation include exposure to intake charge entering the combustion chamber at temperatures of between about −40° C. and +60° C. and exposure to the hot combustion gases which can be at temperatures of between +1200° C. and +2800° C. Accordingly, adhesion of the catalyst to the surface upon which it is deposited is important.

Figure 2:
FIG. 2 shows a magnified image of the surface of a Pd coating on a metal sleeve.
Figure 3:
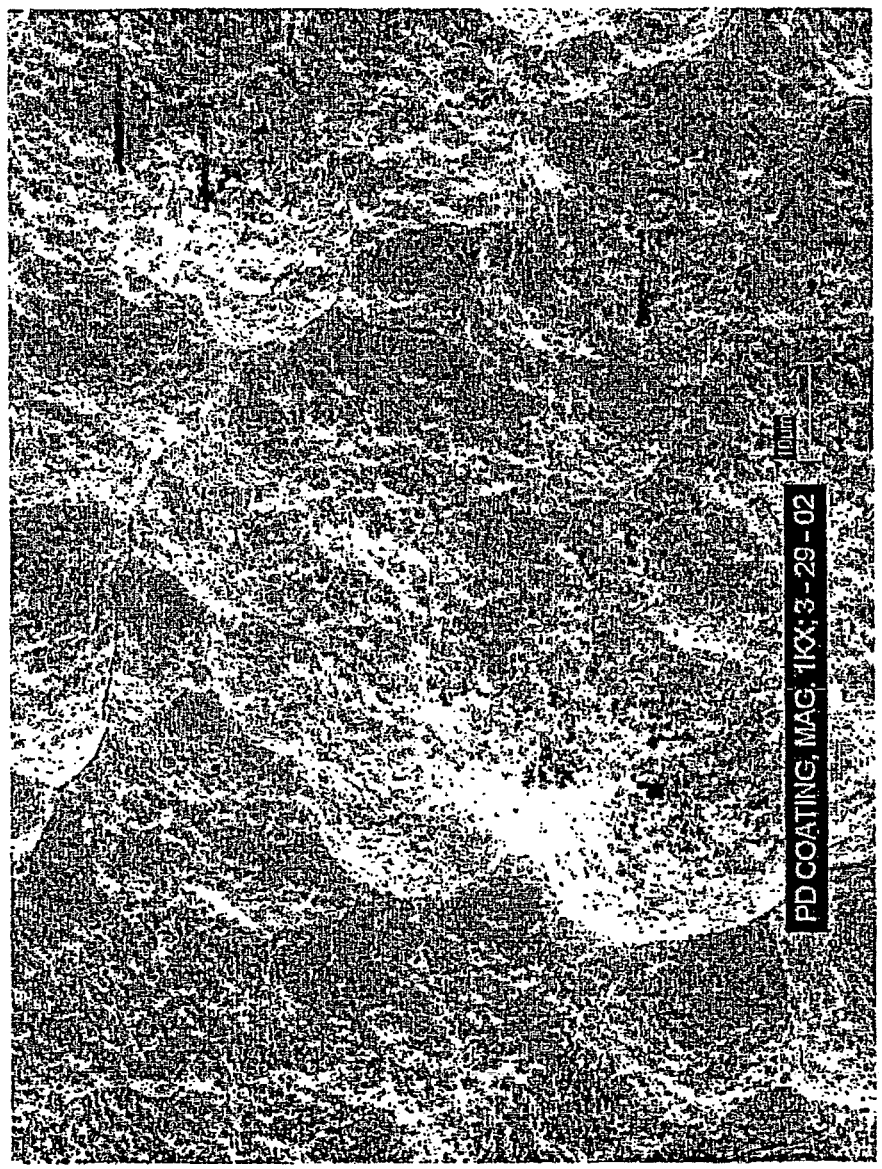
FIGS. 3 and 4 are magnified images of the surface of a Pd coating on a metal sleeve after different durations of oven aging at 800° C.
Figure 4:

FIG. 2 shows a magnified image of the surface of a metal sleeve with a Pd coating. The degree of magnification in this image and other images included in the Figures is illustrated by the scale bar on the image that measures 10 microns. The coated surface is characterized by a regular crack pattern. Catalyst adhesion can be improved by heat-treating the catalyst coating. FIG. 3 is a magnified image of the surface of a Pd coating after 10 minutes of oven aging at 800° C., resulting in annealing of the Pd catalyst and improved adhesion. The annealing process did not result in a change in the surface composition of the catalyst coating. FIG. 4 is a magnified image of the surface of a Pd coating after 8 hours of oven aging at 800° C., which shows substantially no loss of catalyst coverage, demonstrating that annealing a Pd catalyst coating can improve adhesion and that coating, after such treatment can survive extended exposure to high temperature conditions in air. Accordingly, it is desirable to incorporate a heat treatment process into the manufacturing process to anneal the catalyst coating prior to installation in a combustion chamber.

Figure 5:
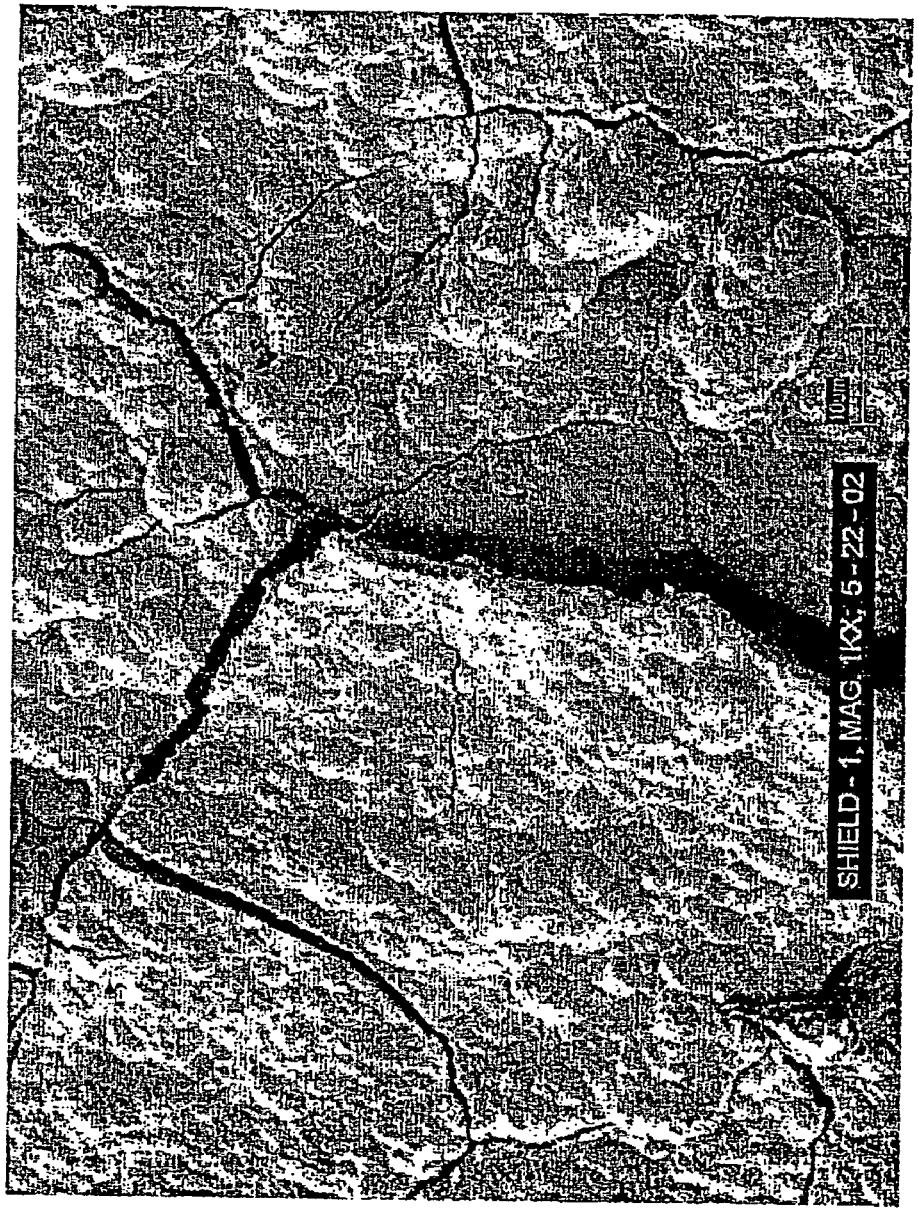
FIG. 5 is a magnified image of the surface of a Pd/Ru coating.

FIG. 5 is a magnified image of the surface of a metal sleeve with a Pd/Ru coating, which is characterized by a regular crack pattern that is very similar to a sleeve surface coated only with Pd. However, as shown in FIG. 5, in this sample, an uneven coverage of the coating indicates that the adhesion of the Pd/Ru coating does not appear to be as good as the coating with Pd alone. Poorer adhesion characteristics might normally teach away from using a Pd/Ru catalyst formulation.

Figure 6:
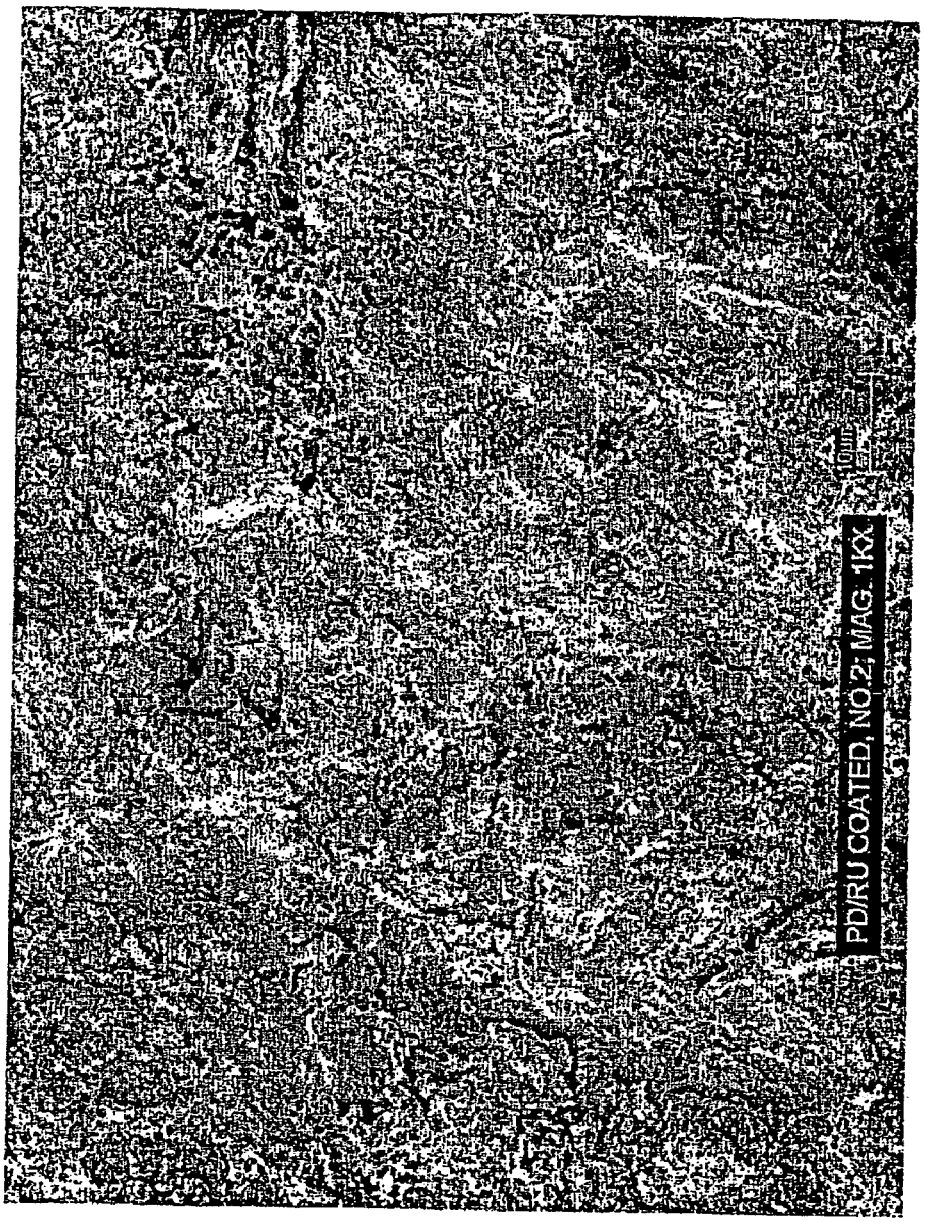
FIGS. 6 and 7 are magnified images of the surface of a Pd/Ru coating after being tested in an engine.
Figure 7:
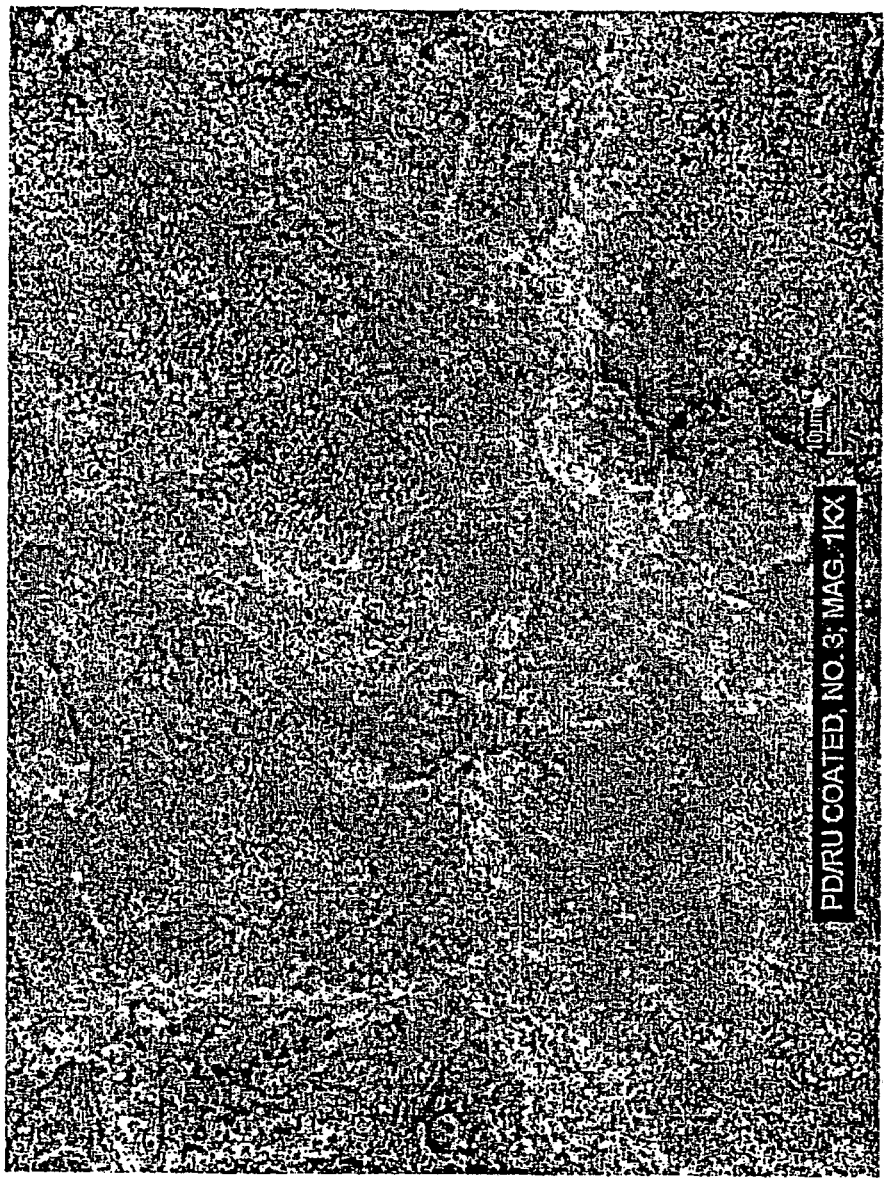

FIGS. 6 and 7 are magnified images of a sleeve surface coated with Pd/Ru after being tested in an engine. These Pd/Ru coatings were annealed prior to installation in an engine. FIG. 6 shows a portion of the sleeve surface that is closer to the cylinder head when installed. FIG. 7 shows a portion of the sleeve surface that is near the tip or open end. A comparison of FIGS. 6 and 7 indicates that there is not a significant difference in the surface characteristics along the length of the sleeve.

Figure 8:
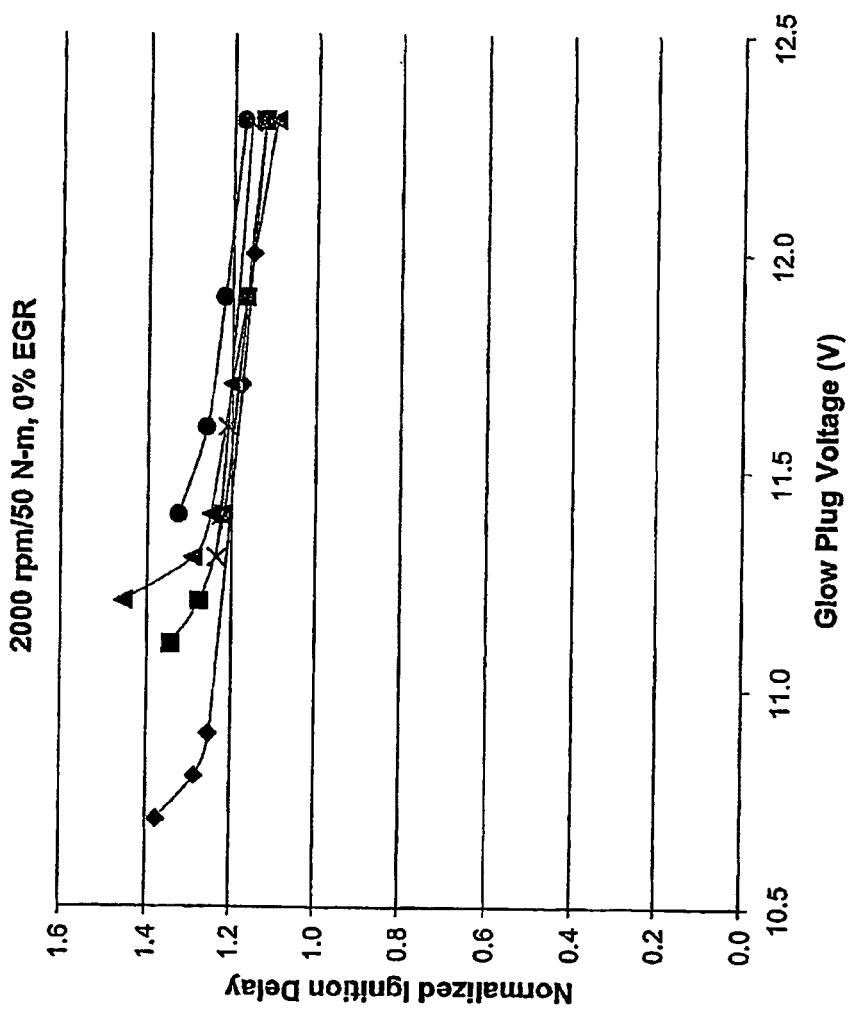
FIG. 8 is a graph that plots normalized ignition delay against glow plug voltage for a gaseous-fueled engine that employed hot surface ignition, with the plotted data collected from tests using different catalyst formulations.

Several different catalyst formulations were tested to determine the preferred formulation. In these tests the same engine was used with the only difference being the formulation of the catalyst coating on the glow plug sleeve. FIG. 8 is a graph that plots some of the data collected from these tests. On this graph, the symbols used to plot the data points correspond to the formulations indicated in Table 1 below:

TABLE 1

| Legend for FIG. 8. | |
| --- | --- |
| Symbol | Formulation for Catalyst Coating |
| Diamond | Pd/Ru |
| Square | Pt |
| Triangle | Pd |
| Circle | Pd/Au |
| X | Baseline (no catalyst coating) |

The data plotted in FIG. 8 were collected from a four-cylinder 1.8 liter diesel cycle engine fueled with natural gas operating at a speed of 2000 rpm with a load of 50 N-m. Normalized ignition delay is plotted against glow plug voltage. For voltages less than 12, the Pd/Ru catalyst formulation provided the shortest ignition delays. The observed reduction in glow plug voltage is equivalent to a reduction in glow plug temperature of between 50° C. and 100° C., and such a temperature reduction is expected to enable a significant increase in glow plug longevity.

Figure 9A:
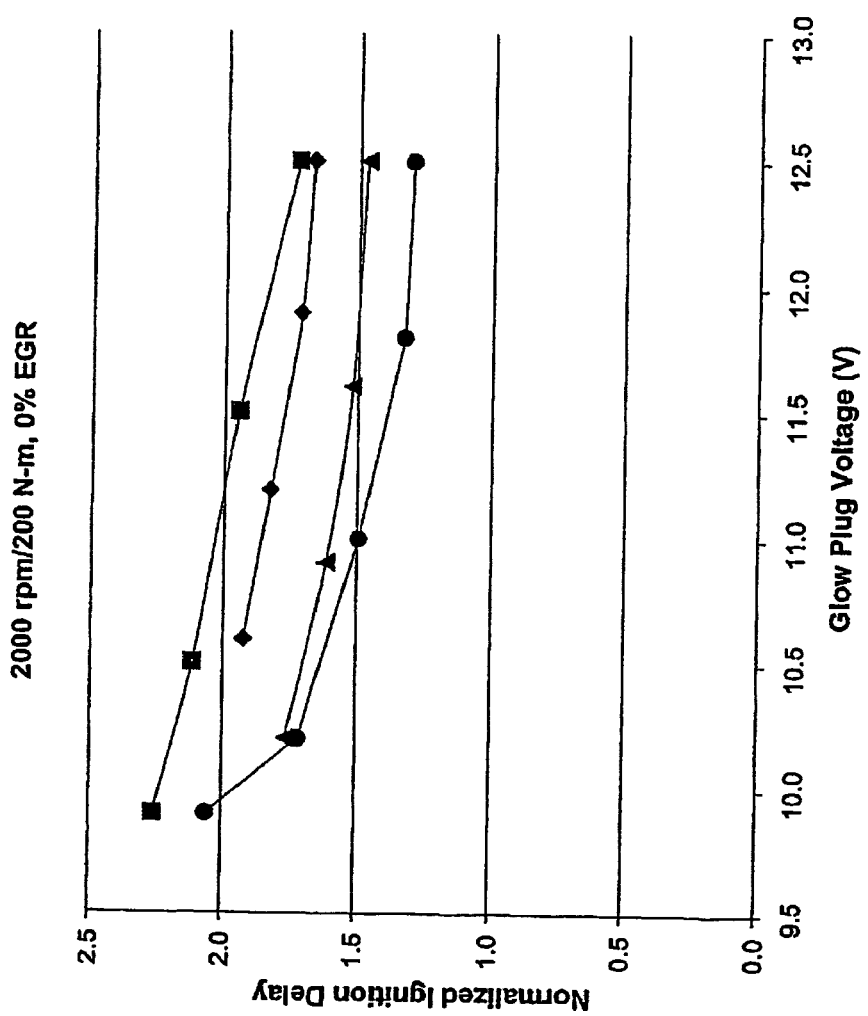
FIG. 9a is a graph that plots normalized ignition delay against glow plug voltage, with the plotted data representing different catalyst formulations whereby the effect of the ruthenium content was determined.

FIG. 9a is a graph that plots normalized ignition delay against glow plug voltage. The data points on this graph were taken from experiments performed to determine whether a higher content of ruthenium is desirable for improving natural gas ignition. Again, a 1.8 liter 4-cylinder diesel cycle engine fueled with directly injected natural was employed. Table 2 below provides a legend for the data points.

TABLE 2

Figure 9B:
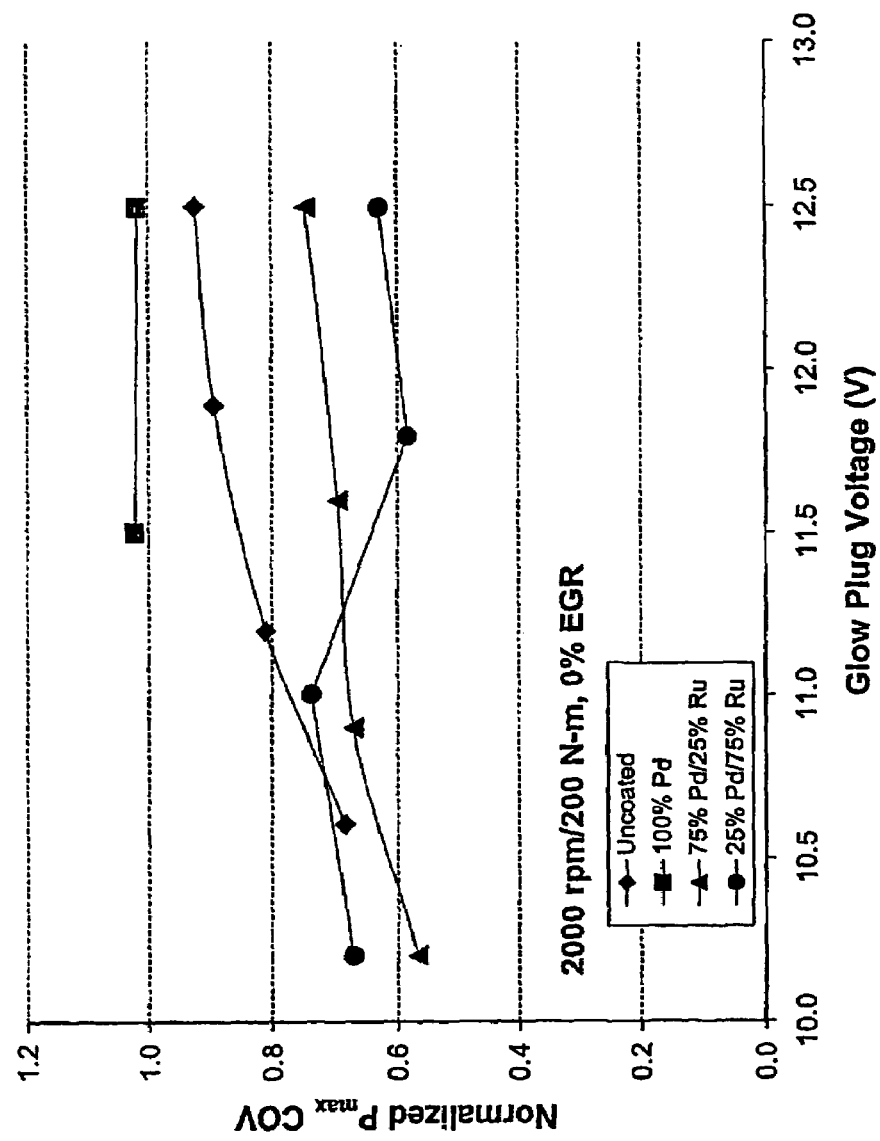

| Legend for FIG. 9a and 9b with percentages measured by weight | |
| --- | --- |
| Symbol | Formulation for Catalyst Coating |
| Diamond | Uncoated |
| Square | 100% Pd |
| Triangle | 75% Pd, 25% Ru |
| Circle | 25% Pd, 75% Ru |

The data plotted in FIG. 9a show ignition delay plotted against glow plug voltage for an engine running at a speed of 2000 rpm with a load of 200 N-m. Of the catalytic formulations tested, for a given voltage, the shortest ignition delay was achieved with the formulation that had the highest content of ruthenium (25% Pd and 75% Ru, by weight). The data plotted in FIG. 9b shows combustion stability (as indicated by lower values of the coefficient of variation—COV—of maximum cylinder pressure) as a function of glow plug voltage for an engine operating under the same conditions. The figure indicates that, of the catalytic formulations tested, the best combustion stability was achieved with the formulation containing the highest fraction of ruthenium (25% Pd and 75% Ru, by weight). It is believed that these results show that improved combustion stability and lower voltage operation can be achieved in engines burning natural gas with catalyst formulations that contain more ruthenium than palladium. A possible explanation of this performance advantage is that a bi-functional mechanism improves the performance of the catalytic alloy, and different catalytic formulations can be used for different fuels depending upon the affinity of one of the catalytic elements for oxygen compared to the affinity of another one of the catalytic elements for fuel. In the examples described herein, it is believed that methane, CO and $CH_x$ adsorb preferentially on Pd, which has a greater affinity for these molecules compared to that of Ru, and oxygen absorbs preferentially on Ru, which has a greater affinity for oxygen compared to that of Pd.

Figure 10:
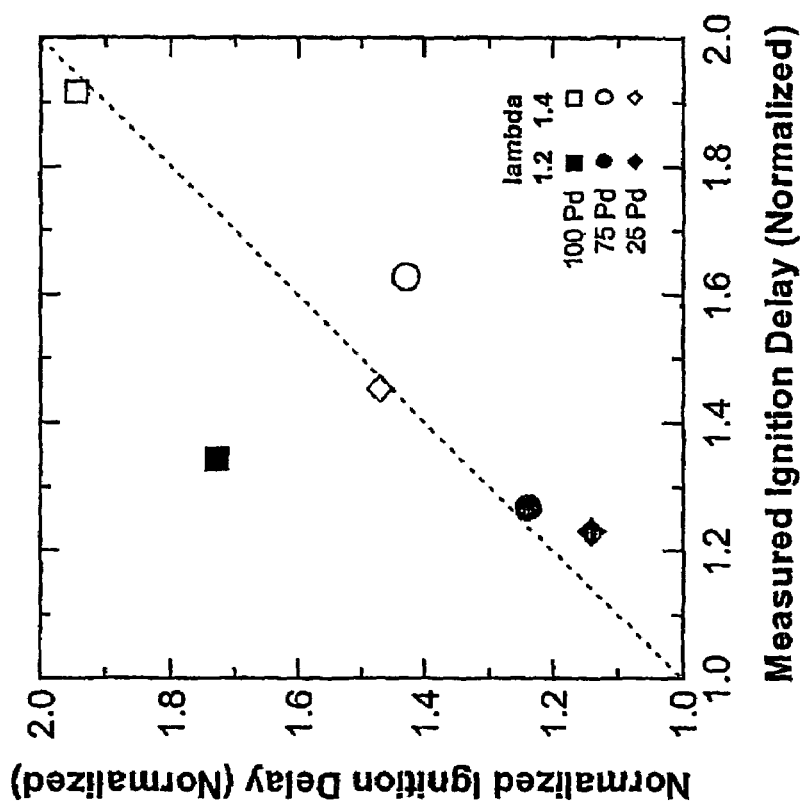
FIG. 10 is a graph that plots the normalized calculated ignition delays predicted by a mathematical microkinetic model versus experimentally measured ignition delays.

A mathematical microkinetic model was also constructed to predict ignition delay for different catalyst formulations. In the microkinetic model, ignition delay was defined as the time required for the initial temperature to increase by 10 percent over the initial value. Initial solid temperatures and inlet gas temperature was set at 1500° K. In FIG. 10, the ignition delays calculated by the model were plotted against the ignition delays experimentally measured in a single cylinder of an engine under a load of 50 N-m and 200 N-m. The legend provided on the graph indicated catalyst formulation by indicating the percent composition by weight of Pd with the remainder being Ru. FIG. 10 shows that the microkinetic model correctly predicts the reduction in ignition delay with increasing lambda for each sleeve coating, and shorter ignition delays for the catalytic formulations comprising 25% Pd and 75% Ru.

Figure 11:
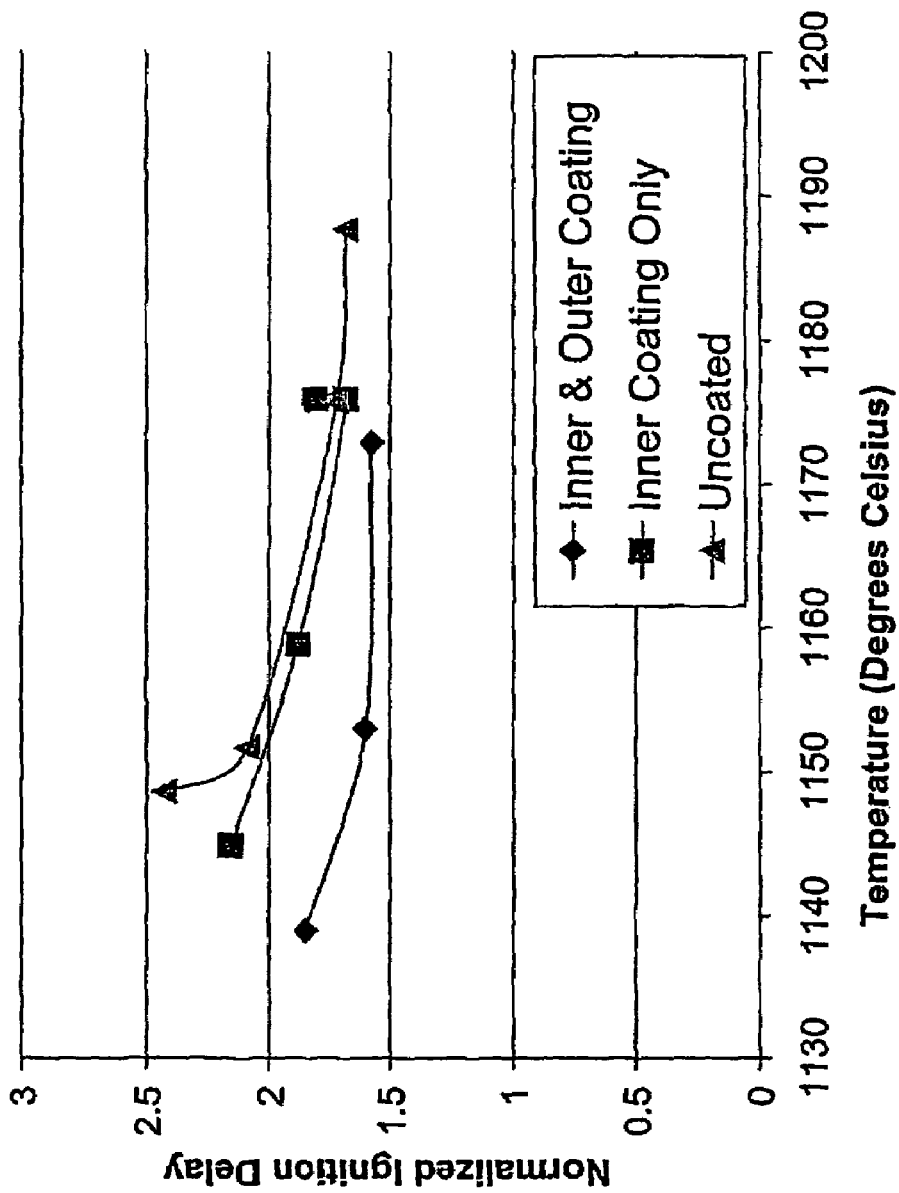
FIG. 11 is a graph that plots normalized ignition delay against bulk glow plug temperature.

It is believed that providing a catalyst coating on the inner and outer sleeve surfaces improves ignition through increased catalyst surface area, which results in increased exposure of the catalyst to combustible air/fuel mixtures. Experimental results support this belief by demonstrating a significant reduction in ignition delay for sleeves with a catalytic coating on both the inner and outer surfaces, compared to a sleeve with a catalytic coating on the inner surface only. FIG. 11 is a graph that plots normalized ignition delay against bulk glow plug temperature. As already noted, to improve glow plug durability and longevity, it is desirable to operate the glow plug at a lower temperature. FIG. 11 shows that by coating the inner and outer surface of the glow plug sleeve a gaseous fuel such as natural gas can be reliably ignited at lower temperatures. The plotted diamond symbols indicate the data points measured for a sleeve with a catalytic coating on the inner and outer surfaces of the glow plug sleeve, and the plotted square symbols indicate the data points measured for a sleeve with a catalytic coating only on the inner surface of the glow plug sleeve. The plotted triangle symbols indicate the data points that were measured when the glow plug sleeve was uncoated. In all of these tests the engine was at idle and operating without any exhaust gas recirculation.

As will be apparent to those skilled in the art in the light of the foregoing disclosure, many alterations and modifications are possible in the practice of this invention without departing form the spirit or scope thereof. Accordingly, the scope of the invention is to be construed in accordance with the substance defined by the following claims.

What is claimed is:

1. An internal combustion engine comprises a combustion chamber defined by a cylinder, a cylinder head covering one end of said cylinder, and a piston reciprocable within said cylinder and having a piston head facing said cylinder head, said engine comprising:
    (a) an intake port for introducing a charge into said combustion chamber;
    (b) an exhaust port for exhausting combustion products from said combustion chamber;
    (c) a fuel injection valve disposed in said cylinder head for introducing a fuel directly into said combustion chamber; and
    (d) an ignition assist apparatus disposed within said combustion chamber comprising an electric incandescent ignitor with a sleeve disposed around said ignitor and a catalytic alloy deposited on said sleeve, said catalytic alloy comprising a first catalytic element with a greater affinity for oxygen than that of a second catalytic element, and said second catalytic element having a greater affinity for said fuel than that of said first catalytic element.

2. The internal combustion engine of claim 1 wherein said fuel injection valve is adapted to deliver a gaseous fuel.

3. The internal combustion engine of claim 2 wherein said fuel comprises methane.

4. The internal combustion engine of claim 3 wherein said gaseous fuel is natural gas.

5. The internal combustion engine of claim 2 wherein said first catalytic element is ruthenium.

6. The internal combustion engine of claim 1 wherein said second catalytic element is selected from the group consisting of palladium and platinum.

7. The internal combustion engine of claim 6 wherein said first catalytic element represents a higher proportion by weight of said catalytic alloy than said second catalytic element.

8. The internal combustion engine of claim 7 wherein of the catalytic material in said catalytic alloy, said first catalytic element is about 75 percent by weight.

9. The internal combustion engine of claim 1 wherein said sleeve comprises an interior surface facing said ignitor and an exterior surface facing said combustion chamber, and said catalytic coating is disposed on both said interior and said exterior surfaces.

10. The internal combustion engine of claim 1 wherein said sleeve has a tubular portion that surrounds said ignitor and an open end.

11. The internal combustion engine of claim 1 wherein said sleeve has a tubular portion that surrounds said ignitor, a closed end, and a plurality of holes for introducing a combustible mixture comprising said fuel into a space between said sleeve and said ignitor, and for expelling a combustion flame from said space into said combustion chamber.

12. The internal combustion engine of claim 1 wherein said sleeve is spaced apart from said igniter by an open annular space that surrounds said igniter and that is in communication with said combustion chamber.

13. The internal combustion engine of claim 1 wherein said catalytic alloy that is deposited on said sleeve is heat treated before installation in said engine.

14. A method of assisting ignition of a fuel in an operating internal combustion engine, in each engine cycle said method comprising:
    (a) introducing a charge into the combustion chamber through an intake port;
    (b) injecting said fuel directly into a combustion chamber;
    (c) electrically heating a glow plug to assist with igniting said fuel;
    (d) exhausting combustion products from said combustion chamber through an exhaust port; and
    (e) shielding said glow plug with a sleeve spaced apart and substantially around the sides of said glow plug, wherein said sleeve has a catalytic coating deposited thereon, said catalytic coating comprising a first catalytic element and a second catalytic element, wherein said first catalytic element has a greater affinity for oxygen than that of said second catalytic element, and said second catalytic element has a greater affinity for said fuel than that of said first catalytic element.

15. The method of claim 14 wherein said first catalytic element is ruthenium.

16. The method of claim 14 wherein said second catalytic element as palladium.

17. The method of claim 14 wherein said catalytic coating is deposited on the inside surface of said sleeve that faces said glow plug and the outside surface of said sleeve that faces said combustion chamber.

18. The method of claim 14 wherein said fuel is natural gas.

19. The method claim 14 wherein said glow plug is heated by applying a voltage of between 10 volts and 12 volts.

20. The method of claim 14 wherein injecting said fuel starts when a piston reciprocating within said cylinder is between 40 degrees before top dead center and 10 degrees after top dead center.

21. The internal combustion engine of claim 14 wherein said catalytic alloy is heat treated by heating said sleeve and said catalytic alloy to a temperature of 500° C. to 1000° C. for at least 10 minutes.

* * * * *

UNITED STATES PATENT AND TRADEMARK OFFICE
CERTIFICATE OF CORRECTION

PATENT NO.       : 7,077,115 B2
APPLICATION NO.  : 11/150035
DATED            : July 18, 2006
INVENTOR(S)      : Robert Weber et al.

Page 1 of 1

It is certified that error appears in the above-identified patent and that said Letters Patent is hereby corrected as shown below:

Column 1, after Line 15, please insert the following paragraph:

--STATEMENT REGARDING FEDERALLY SPONSORED RESEARCH OR DEVELOPMENT

This invention was made with U.S. Government support under Subcontract No. NDX-2-31070-02 under the prime contract with National Renewable Energy Laboratory awarded by the Department of Energy. The Government has certain rights in this invention.--

Signed and Sealed this

Twenty-fourth Day of February, 2009

JOHN DOLL
*Acting Director of the United States Patent and Trademark Office*